(12) United States Patent
Fuetterer et al.

(10) Patent No.: US 9,938,758 B2
(45) Date of Patent: Apr. 10, 2018

(54) REINFORCING ELEMENT FOR A MOTOR VEHICLE DOOR, MOTOR VEHICLE DOOR AND METHOD FOR THE PRODUCTION OF A REINFORCING ELEMENT

(71) Applicant: Daimler AG, Stuttgart (DE)

(72) Inventors: Michael Fuetterer, Hildrizhausen (DE); Stefan Linke, Gaertringen (DE); Manfred Kempf, Vogt (DE); Juergen Thalemann, Steinheim (DE); Oya Barberis, Sindelfingen (DE)

(73) Assignee: Daimler AG, Stuttgart (DE)

( * ) Notice: Subject to any disclaimer, the term of this patent is extended or adjusted under 35 U.S.C. 154(b) by 45 days.

(21) Appl. No.: 14/900,125

(22) PCT Filed: May 30, 2014

(86) PCT No.: PCT/EP2014/001471
§ 371 (c)(1),
(2) Date: Dec. 18, 2015

(87) PCT Pub. No.: WO2014/202183
PCT Pub. Date: Dec. 24, 2014

(65) Prior Publication Data
US 2016/0145920 A1 May 26, 2016

(30) Foreign Application Priority Data

Jun. 19, 2013 (DE) .................. 10 2013 010 325

(51) Int. Cl.
*E05D 5/02* (2006.01)
*B60J 5/04* (2006.01)
(Continued)

(52) U.S. Cl.
CPC ............. *E05D 5/0207* (2013.01); *B60J 5/00* (2013.01); *B60J 5/0451* (2013.01); *B60J 5/0455* (2013.01);
(Continued)

(58) Field of Classification Search
CPC ........ B60J 5/041; B60J 5/0437; B60J 5/0455; B60J 5/0483; B60J 5/0451; E05D 5/0207
(Continued)

(56) References Cited

U.S. PATENT DOCUMENTS 5,971,460 A * 10/1999 Enning ................ B62D 23/005
296/203.03
6,073,308 A 6/2000 Linnenbrink et al.
(Continued)

FOREIGN PATENT DOCUMENTS

CN 101166643 A 4/2008
DE 37 34 369 A1 4/1989
(Continued)

OTHER PUBLICATIONS

Machine Translation of JP-3580225-B2, printed from the JPO website, Mar. 29, 2017.*
(Continued)

*Primary Examiner* — Jason S Morrow
(74) *Attorney, Agent, or Firm* — Crowell & Moring LLP

(57) ABSTRACT

A reinforcing element for a motor vehicle door is disclosed which is a light metal or a light metal alloy. The reinforcing element is produced from a light metal blank by massive forming, preferably by forging.

9 Claims, 1 Drawing Sheet

(51) Int. Cl.
*B60J 5/00* (2006.01)
*E05D 5/00* (2006.01)
*E05D 7/00* (2006.01)
*E05D 11/00* (2006.01)

(52) U.S. Cl.
CPC .............. *B60J 5/0483* (2013.01); *E05D 5/00* (2013.01); *E05D 7/00* (2013.01); *E05D 11/00* (2013.01)

(58) Field of Classification Search
USPC ................................... 296/30, 146.6, 146.11
See application file for complete search history.

(56) References Cited

U.S. PATENT DOCUMENTS

| | | | |
|---|---|---|---|
| 6,082,811 A | 7/2000 | Yoshida | |
| 6,779,829 B2* | 8/2004 | Chappuis | B60J 5/0427 296/146.5 |
| 7,140,674 B2* | 11/2006 | Miyoshi | B62D 25/082 296/193.05 |
| 2005/0001448 A1 | 1/2005 | Omori et al. | |
| 2009/0236871 A1 | 9/2009 | Shibasaki | |
| 2010/0026050 A1* | 2/2010 | Aizawa | B62D 25/06 296/203.01 |
| 2011/0253853 A1 | 10/2011 | Horneck | |
| 2013/0255842 A1* | 10/2013 | Hori | C22F 1/047 148/550 |
| 2015/0151359 A1* | 6/2015 | Hu | B22D 19/02 164/75 |
| 2015/0352933 A1* | 12/2015 | Bendiks | B60J 5/0431 428/596 |
| 2016/0039462 A1* | 2/2016 | Kempf | B62D 25/20 296/204 |
| 2016/0123057 A1* | 5/2016 | Mildner | B60J 5/0431 296/146.11 |
| 2016/0264182 A1* | 9/2016 | Kirtzakis | B62D 25/04 |
| 2016/0288629 A1* | 10/2016 | Hu | B22D 17/00 |

FOREIGN PATENT DOCUMENTS

| | | | |
|---|---|---|---|
| DE | 44 30 256 A1 | 12/1995 | |
| DE | 297 13 031 U1 | 1/1999 | |
| DE | 698 07 988 T2 | 8/2003 | |
| DE | 10 2005 061 562 A1 | 7/2007 | |
| DE | 10 2012 012 803 A1 | 12/2012 | |
| GB | 2479652 A | 10/2011 | |
| JP | 3580225 B2 * | 6/2000 | ............ B60J 5/0404 |
| JP | 2001-341529 A | 12/2001 | |
| JP | 3580225 B2 | 10/2004 | |

OTHER PUBLICATIONS

Chinese Office Action issued in Chinese counterpart application No. 201480034790.3 dated Oct. 17, 2016, with partial English translation (Eleven (11) pages).

PCT/EP2014/001471, International Search Report (PCT/ISA/220 and PCT/ISA/210) dated Jul. 31, 2014, with partial English translation, enclosing Written Opinion of the International Searching Authority (PCT/ISA/237) (Twelve (12) pages).

German Search Report issued in counterpart DE 10 2013 010 325.8 dated Jan. 10, 2014, with Statement of Relevancy (Six (6) pages).

* cited by examiner

REINFORCING ELEMENT FOR A MOTOR VEHICLE DOOR, MOTOR VEHICLE DOOR AND METHOD FOR THE PRODUCTION OF A REINFORCING ELEMENT

BACKGROUND AND SUMMARY OF THE INVENTION

The invention relates to a reinforcing element for a motor vehicle door, a motor vehicle door, and a method for the production of a reinforcing element for a motor vehicle door.

Motor vehicle doors having reinforcing elements of the type discussed here are known. A motor vehicle door emerges from the German specification DE 10 2005 061 562 A1, which comprises reinforcing elements, in particular hinge and/or lock reinforcements based on light metal in sheet metal construction. The reinforcing elements consist of profiled sheet metal at least in partial regions. Usually, deep-drawn or pressed aluminum sheets are fastened to a lateral frame structure of the motor vehicle door for reinforcement. A steel threaded plate is additionally fastened in the hinge region, to which a side impact strut is attached. The production of the profiled sheet metal is difficult as high degrees of reforming are necessary due to the construction formation. Less ductile materials such as aluminum or alloys thereof can accordingly be reformed only with great procedural effort. After the deep drawing, a cracking open of the deep-drawn component results such that the dimensional tolerance of the same is low. Reworking is therefore not required in any case. The usual mixed construction method in which steel components are combined with light metal components leads to volatile property changes at the transfer points and problems result from this, for example with contact corrosion. In particular, sheet metal or profile components, but also cast components are overall designed for a high-loaded region with regard to their wall thickness or their cross-section. Component regions which are less heavily loaded are over-dimensioned in this case. The components therefore have a very high weight.

The object of the invention is to create a reinforcing element, a motor vehicle door and a method for the production of a reinforcing element for the motor vehicle door, wherein the disadvantages referred to do not occur.

Due to the fact that the reinforcing element is produced from a light metal blank by forging, very high degrees of reforming are readily able to be achieved. Thus it is possible to also produce complex reinforcing elements in lightweight construction to be dimensionally tolerant with a low effort. The forged reinforcing element has a high-density structure, whereby it is provided with a high strength. It is therefore able to be highly loaded by mechanical stresses. Furthermore, during forging it is possible to set a fiber course in the component according to load, in particular to bundle fibers in mechanically high-loaded regions such that these have an increased stability. Hereby it is possible to also form highloaded regions with thinner walls than is the case for other production methods. Additionally it is possible during forging to achieve a varying cross-section or an intermittent wall thickness in the reinforcing element, wherein mechanically higher loaded regions can be formed with a greater cross-section or greater wall thickness than mechanically lower loaded regions. Overall the reinforcing element can therefore be tailored to the expected mechanical loads and can be locally thickened precisely where particularly high forces engage. In particular, load paths along the reinforcing element are able to be set in a simple manner, as the material can be pressed during forging according to the expected mechanical loads and can be varied in its thickness in a targeted manner.

These possibilities lead to the reinforcing element overall having an increased wall thickness only where this is also necessary according to load. Therefore, overall, a thin-walled component can be created which is lighter, but nevertheless more stable than a corresponding deep-drawn, profiled or cast part.

The reinforcing element is additionally distinguished on the one hand by at least one reinforcing region for a hinge being forged on the reinforcing element. This means that the reinforcing element is preferably forged in one piece with the at least one reinforcing region from only one light metal blank, wherein the at least one reinforcing region is formed from the material of the light metal blank during forging. Alternatively it is possible that the at least one reinforcing region is forged to the reinforcing element during forging. In this case, the reinforcing region is present as a separate part before forging, but is connected to the reinforcing element to become a single-piece component during forging. Thus, during forging, a firm bond is particularly preferably achieved between the first separate elements. Alternatively or additionally it is possible that a positive bond is also achieved between the elements.

Independently of whether the at least one reinforcing region is forged to the reinforcing element or forged on this, additional steel threaded plates can in any case be omitted for reinforcement of the hinge region as the corresponding functionality is assumed by the forged reinforcing element.

On the other hand, the reinforcing element according to the invention is also distinguished by at least one fastening region for a strut being forged on the reinforcing element. Alternatively it is also possible—as stated previously for the reinforcing region—that the at least one fastening region is forged to the reinforcing element. In any case, a separate reinforcing or fastening component is also omitted here which would otherwise typically comprise steel, because now the corresponding fastening surface for the strut is arranged or formed on the forged reinforcing element itself. Preferably, the at least one fastening region is formed for fastening a side impact strut. The high mechanical load-bearing capability of the forged reinforcing element ensures that both the strut load as well as a possibly occurring impact load in the event of an accident is better absorbed.

Preferably, the reinforcing element has local deformation zones which are targetedly provided, in which it is deformed in a predetermined manner in the event of an accident. Such deformation zones can also be readily formed on the reinforcing element during forging. In particular it is also possible to form the wall thickness of the reinforcing element to be lower in the region of a deformation zone than in other regions.

It is possible to produce a very dimensionally tolerant component during forging. Here, in particular, no cracking open occurs such that the dimensional tolerance and therefore also the reproducibility of the reinforcing element are ensured. Reworking to ensure dimensional tolerance can be omitted.

The forged component has excellent mechanical properties with regard to its tensile strength, yield strength, elongation at break and ductility. Here, in particular sheet metal components and casting components based on light metal are considered. The corresponding mechanical properties of the forged reinforcing element are located—although it comprises a light metal or a light metal alloy—at the level of a steel component. Therefore, excellent mechanical properties are combined with a low weight which takes into account the lightweight construction concept.

The reinforcing element is preferably produced in one piece from only one light metal blank by forging. A number of components is hereby reduced and join connections are omitted. Therefore, at the same time, the assembly effort for a motor vehicle door which comprises the reinforcing element is reduced. Overall, therefore, the production costs for the motor vehicle door and also for the reinforcing element can be lowered.

The forged reinforcing element is readily accessible for all usual join techniques such that no problems result during joining to adjacent components of the door frame of the motor vehicle door.

If the reinforcing region and/or the fastening region is/are forged on the reinforcing element, this/these has/have the same material as the remaining regions of the reinforcing element. If the reinforcing region and/or the fastening region is/are, however, firstly provided as separate elements, this is not necessarily required. An exemplary embodiment is preferred, however, in which the reinforcing region and/or the fastening region is/are formed from the same material of which the remaining reinforcing element consists.

A reinforcing element is preferred which is distinguished by at least one threaded nut being integrated into the reinforcing element. Preferably a riveting nut is integrated into the reinforcing element. The at least one threaded nut is forged into the reinforcing element or is forged to the reinforcing element. Here, the term "forged into" refers to the at least one threaded nut being reforged with the material of the reinforcing element at least in regions. Therefore a particularly close and stable connection between the threaded nut and the reinforcing element results, wherein preferably both a firm bond and a positive bond are achieved. The term "forged to" refers to the threaded nut being fastened to the reinforcing element during forging, wherein preferably a firm bond and/or a positive bond are achieved. With the aid of the integrated threaded nut, it is readily possible to achieve a simple screw connection of a strut, in particular a side impact strut. The at least one threaded nut is therefore particularly preferably provided in the fastening region for the strut.

A reinforcing element is also preferred which is distinguished by a lateral frame for the motor vehicle door being forged to the reinforcing element at least in regions or being forged on the reinforcing element. In this way, a component count is further reduced because the lateral frame is also provided in one piece with the reinforcing element at least in regions. Particularly preferably, it is formed from the material of the only one light metal blank during forging. Alternatively it is possible that the lateral frame is provided firstly separately at least in regions and is connected to the remaining reinforcing element by forging. Here, a firm and/or a positive bond is/are preferably achieved. Also, a single-piece forged component therefore results, such that join connections are omitted and the assembly effort as well as the production costs for the reinforcing element and also for the motor vehicle door are reduced.

In particular the forged reinforcing element preferably replaces the lateral frame for the motor vehicle door partially or completely. Not only are join operations hereby saved, but space is also saved which otherwise would be necessary for separate reinforcing components.

A reinforcing element is also preferred which is distinguished by having a wall thickness of at least 2 mm to at most 5 mm. Here, the wall thickness is formed to be different locally according to load. In particular, a thin-walled reinforcing element is therefore provided which only comprises a greater wall thickness in mechanically higher loaded regions while mechanically lower loaded regions are formed to be thin-walled. This local construction according to load takes into consideration the concept of lightweight construction.

A reinforcing element is also preferred which is distinguished by comprising aluminum or an aluminum alloy, in particular a wrought alloy, wherein it preferably consists of one of the materials referred to. The reinforcing element is therefore at the same time formed to be light and to be able to be mechanically highly loaded through the forging.

The object is also solved by a motor vehicle door having the features being created. This is distinguished by a reinforcing element according to one of the previously described exemplary embodiments. The advantages are herein achieved which have already been explained in connection to the reinforcing element.

Preferably, the reinforcing element at least partially replaces a lateral frame of the motor vehicle door, whereby join operations are omitted and space for separate reinforcing components is saved.

The object is finally also solved by a method for the production of a reinforcing element according to one of the previously described exemplary embodiments for a motor vehicle door being created. The method is distinguished by the reinforcing element being produced from a light metal blank by forging. Therein the advantages are achieved which have already been executed in connection with the reinforcing element.

The reinforcing element is preferably produced in one piece from only one light metal blank by forging.

A method is preferred which is distinguished by at least one reinforcing region, at least one fastening region and/or, at least in regions, one lateral frame for the motor vehicle door being forged on the reinforcing element or forged to the reinforcing element.

A method is also preferred which is distinguished by a threaded nut, preferably a riveting nut, being integrated into the reinforcing element. Here, the at least one threaded nut is forged into the reinforcing element or forged to the reinforcing element.

A method is also preferred in which the reinforcing element undergoes a heat treatment at least in regions. Thus it is possible to generate a high-strength light metal component having properties which are adjusted in a targeted manner and differ in particular locally according to need by means of a locally adapted heat treatment.

The reinforcing element is particularly preferably produced by means of a hot forging method, wherein the method preferably comprises an integrated heat treatment during hot forging. In this way, it is possible in a particularly flexible manner to locally adjust the mechanical properties of the reinforcing element according to need and preferably locally, for which the heat treatment is implemented to be locally different accordingly.

Finally, a method is preferred which is distinguished by the reinforcing element being partially mechanically processed. In particular at cut points and/or join points to adjacent components of the motor vehicle or of a motor vehicle body shell structure, it is possible to process the reinforcing element mechanically in order to better fulfil requirements for the cut or join points.

The description of the reinforcing element as well as the motor vehicle door on the one hand and the method for the production of the reinforcing element on the other hand are to be understood to be complementary to each other. In particular, method steps which have been described explicitly or implicitly in connection with the reinforcing element or the motor vehicle door, preferably alone or in combination with each other, are steps of a preferred exemplary embodiment of the method. Conversely, features which have been described explicitly or implicitly in connection with the method, preferably alone or in combination with each other, are features of an exemplary embodiment of the reinforcing element or of the motor vehicle door.

BRIEF DESCRIPTION OF THE DRAWINGS

Figure 1:
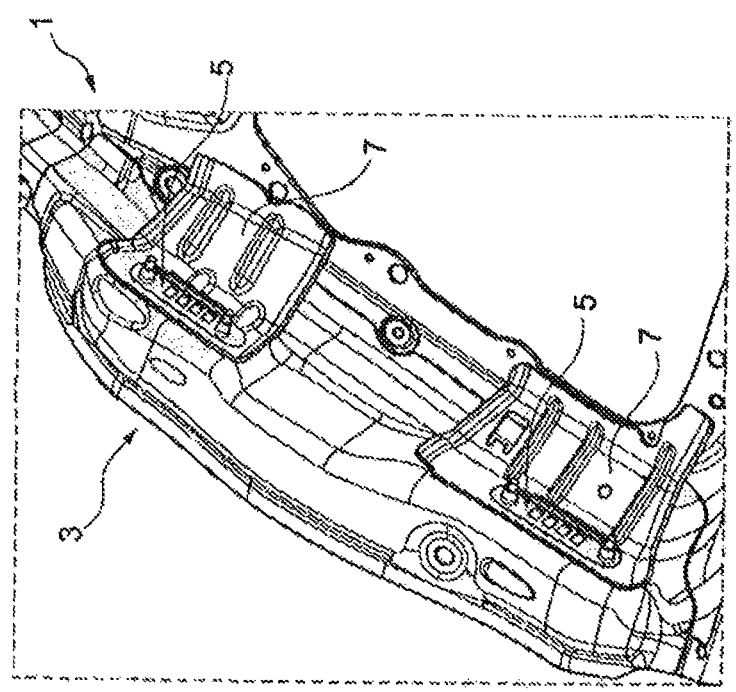
FIG. 1 illustrates a reinforcing element according to prior art.

FIG. 1 shows a region of a motor vehicle door 1 which has a reinforcing element 3. This is produced here from a light metal alloy as a deep-drawn or profiled sheet metal component. Two reinforcing plates 7 are provided which are produced from steel in the region of only indicated hinges 5. The complexly formed reinforcing element 3 is only able to be produced with great procedural effort. It has a constant wall thickness which is adapted to the mechanically most highly loaded region. Hereby it already has a comparably large weight. Added to this is the weight of the reinforcing plates 7 which are made from steel and therefore are correspondingly heavy. Additionally, join operations are necessary in order to join the reinforcing plates 7 to the reinforcing element 3. The fact that the reinforcing structure which here comprises the reinforcing element 3 and the two reinforcing plates 7 is formed in three parts means an increased logistic effort.

Figure 2:
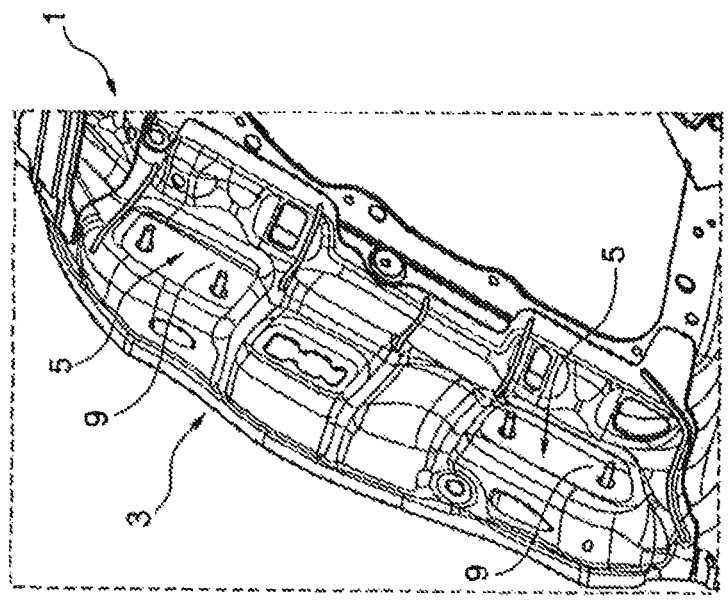
FIG. 2 illustrates an exemplary embodiment of a reinforcing element.

FIG. 2 shows an exemplary embodiment of a reinforcing element. Identical and functionally identical elements are provided with the same reference numerals such that, in this respect, reference can be made to the previous description. The reinforcing element 3 is forged in one piece from a light metal blank. Here, in particular in the region of the only indicated hinges 5, reinforcing regions 9 are forged on the reinforcing element 3. Therefore it is possible to omit the separate reinforcing plates 7 made from steel.

The reinforcing element 3 has a wall thickness which is designed locally according to need, wherein mechanically high-loaded regions are formed to have thicker walls than mechanically lower loaded regions. At the same time, overall it has a mechanically highly dense structure, and a fibre course is sealed in the mechanically high-loaded regions such that these are formed to be able to have a high load-bearing capability. It is thus possible to also form the mechanically high-loaded regions to have thinner walls than with other production techniques. Overall, therefore, a very light reinforcing element 3 is created which additionally takes into consideration the lightweight construction concept in that reinforcing plates 7 made from steel can be omitted.

Therefore it is shown overall that the reinforcing element 3 at the same time is formed to be light and with a high load-bearing capability, wherein it is able to be produced simply and cost-effectively At the same time a joining effort and therefore overall an assembly effort for a motor vehicle door which has the reinforcing element 3 is reduced which saves production costs. The logistic effort is reduced because the reinforcing element 3 is formed in one piece, wherein functional regions are integrated into the reinforcing element 3 or are forged on this or are forged to this. The same advantages are achieved in connection with the motor vehicle door and the method for the production of a reinforcing element.

The invention claimed is:

1. A reinforcing element for a motor vehicle door, comprising:
a light metal or a light metal alloy reinforcing element, wherein the reinforcing element, which is provided separately from a frame structure of the motor vehicle door, is produced from a light metal blank by forging, wherein at least one reinforcing region for a hinge and at least one fastening region for a strut are forged on the reinforcing element in one piece or are forged to the reinforcing element in one piece.

2. The reinforcing element according to claim 1, wherein at least one threaded nut is integrated into the reinforcing element and wherein the at least one threaded nut is forged into the reinforcing element or is forged to the reinforcing element.

3. The reinforcing element according to claim 1, wherein a lateral frame for the motor vehicle door is forged to the reinforcing element at least in regions or is formed on the reinforcing element.

4. The reinforcing element according to claim 1, wherein the reinforcing element has a wall thickness of at least 2 mm to at most 5 mm and wherein the wall thickness is formed to be locally different.

5. The reinforcing element according to claim 1, wherein the light metal is aluminum and the light metal alloy is an aluminum alloy.

6. A motor vehicle door comprising a reinforcing element according to claim 1.

7. A method for producing a reinforcing element for a motor vehicle door, comprising the steps of:
producing the reinforcing element from a light metal blank by forging, the reinforcing element being provided separately from a frame structure of the motor vehicle door,
wherein at least one reinforcing region, at least one fastening region, and/or at least in regions one lateral frame for the motor vehicle door is forged on the reinforcing element in one piece or forged to the reinforcing element in one piece.

8. The reinforcing element according to claim 3, wherein the reinforcing element partially replaces the lateral frame for the motor vehicle door.

9. The method according to claim 7, wherein the step of producing the reinforcing element from a light metal blank by forging is performed by means of a hot forging method that includes an integrated heat treatment during a hot forging process.

\* \* \* \* \*